Aug. 6, 1968     W. M. ALLEN ET AL     3,395,467
METHOD AND APPARATUS FOR HARVESTING PEAT MOSS
Filed June 18, 1965
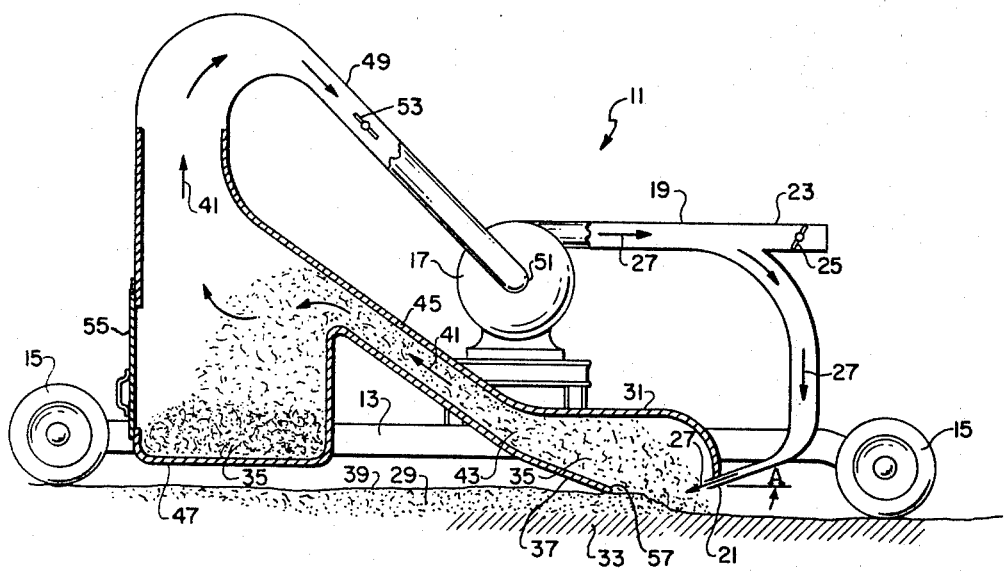
WILLIAM M. ALLEN
GEORGE E. MANNING
        INVENTORS
BY
        ATTORNEYS

United States Patent Office 3,395,467
Patented Aug. 6, 1968

3,395,467
METHOD AND APPARATUS FOR HARVESTING PEAT MOSS
William M. Allen and George E. Mannning, Columbus, Ohio, assignors, by mesne assignments, to Michigan Peat, Inc., New York, N.Y., a corporation of New York
Filed June 18, 1965, Ser. No. 464,950
4 Claims. (Cl. 37—195)

ABSTRACT OF THE DISCLOSURE

A method and apparatus for separating a strata of dry material from a strata of damp material by directing a first stream of air onto the strata of dry material to loosen same from the strata of damp material. A second stream of air is produced contiguous to the loosened material for entraining said loosened material therein.

---

This invention relates to a method and apparatus for harvesting peat moss and the like. More particularly, it concerns a method and apparatus for loosening or separating a strata of material from a strata of relatively denser material and collecting the loosened material.

Generally, past moss is milled or reduced to commercial and uniform size by a machine that is driven over the peat deposit. The milling machine pulverizes and cuts the top layer to a selected depth which is somewhat dependent on the weather. This top milled layer must then be collected, preferably leaving the wet underneath layer behind along with sticks, heavy waste matter, etc. For purposes of discussion herein wet, or substantially damp peat moss is defined as being seventy-five to one hundred percent saturated with moisture and dry peat moss from thirty to fifty percent saturated.

Many devices have been proposed to pick up the dry, milled layer of peat; however, the present conventional methods are generally unsatisfactory from either the success of the separation or the power requirements. A vacuum pickup method by itself, for example, does not collect all of the dry, milled peat. If the vacuum is made more powerful, not only do power costs become excessive, but also, too much of the wet peat and foreign objects are drawn into the collection ducts. Conventional vacuum pickups also require a rather smooth terrain since distance tolerances between the pickup device and the surface of the peat bed are quite critical. Sweeping the dry, milled peat into a pickup chute by means of brushes has also been attempted resulting in an indiscriminate inclusion of wet clumps along with the dry peat.

Briefly described, this invention includes a method and apparatus for loosening and separating an upper layer of material from a lower denser layer of material and collecting the separated material by means of a gaseous medium, such as air, wherein the direction and velocity of the gas is controlled and is particularly adapted to the harvesting of peat moss.

An object of this invention is to provide an economical method and apparatus that collects only the dry, milled, upper layer of peat without disturbing the damp or wet layer of peat beneath the damp layer.

Another object of this invention is to provide an air system for separating and collecting dry, milled peat that is relatively tolerant with respect to distance between the collection device and the peat bed.

Still another object of this invention is to provide a first air stream that loosens and separates dry peat from wet peat and directs the dry peat to a second air stream for collection.

Still another object of this invention, is to provide controlled air velocities wherein the dry, milled peat is entrained into an air stream and sustained in the air stream until a desired collection point is reached where it is precipitated or deposited.

A further object of this invention is to provide apparatus for passage over a dry, milled layer of peat for collecting the milled peat that automatically separates or leaves behind sticks and waste matter that may be mixed with the dry, milled peat.

A still further object of the invention is to use the air for separation and collection of peat very efficiently thereby reducing power requirements and critical tolerances in equipment and clearances.

Still further objects and advantages will be apparent from the drawing, the claims and the discussion that follows:

In the drawing:

The figure is a side elevational view, with parts in section and parts broken away, illustrating the present invention.

Referring to the drawing, the device 11 includes a frame 13 having means suitable for movement such as wheels 15—15. A blower 17, mounted on the frame 13 and connected to power means (not shown) supplies air to a duct 19 that is connected to a wide-mouthed jet 21. The air velocity at the jet 21 is controlled by suitable means such as a bleed-off duct 23 and a damper 25. The air stream, shown by the arrows 27—27 is directed onto an area of the dry, milled peat 29 that is partially enclosed beneath a collection head 31. The air from the jet 21 loosens the upper strata of dry, milled peat 29 from the lower strata of wet or damp peat 33. The air from the jet 21 not only loosens and separates the dry peat 29 from the wet peat 33 but the stream reflecting from the surface of the wet peat 33 directs the loosened dry peat 35 upward and over a deflector 37 having an edge contiguous with the surface 39 of the uncollected dry peat 29.

The dry loosened peat 35 is entrained into a second air stream (shown by the arrows 41—41) at the throat 43 of the collector head 31. The collector-head throat 43 communicates with a vacuum collection passage 45 that leads to a collection bin 47. When the air and entrained peat 35 from duct 41 enters the collection bin 47, the velocity of the second air stream reduces, due to the increased cross-sectional area of the air passage and the lower velocity is insufficient to maintain the dry peat 35 in suspension. The dry peat 35 falls from the air stream to the bottom of the bin 47. The second air stream or vacuum is produced by connecting a duct 49 between the collection bin 47 and the suction side 51 of blower 17. If desired, separate blowers may be used for producing the first and second air streams and for achieving better control thereof. The duct 49 contains means for controlling or adjusting the velocity of the second air stream such as a damper 53. The collector bin 47 is provided with an access door 55 for removal of the collected peat 35.

In the preferred embodiment of the invention, the apparatus is moved (by a tractor or its own power source) over the peat bed surface 39 (to the left as shown in the drawing). The velocity of the first air stream (arrows 27—27) is adjusted so that the stream of air from the jet 21 removes all of the dry, milled peat 29 from the lower strata of wet peat 33 without disturbing the layer of wet peat 33. The preferred velocity of the air discharging from the jet 21 is about 50 feet per second although the range is considerable. The angle of the jet 21 with the horizontal is preferably about 50 degrees and may vary with the jet velocity and size of the collection head 31. The deflector 37 ideally has its end 57 in contact with the peat bed surface 39; however, uneven terrain upsets the ideal condition frequently and the collection head 31 may vary from zero to at least 4 inches from the surface 39 with excellent results. The preferred velocity for the second air stream (shown by arrows 41—41) in the duct 45 is about 50 feet per second. Other velocities are useable, of course, but a relatively minimum velocity is preferred to keep the power requirements low. Although the jet (21) air loosens the dry, milled peat 29, and the material mixed with the dry peat 29, from the layer of wet peat 33, the vacuum stream (arrows 41—41) only entrains the dry, milled peat leaving the heavier matter such as sticks etc. behind. The jet air velocity cannot be too high or the jet of air may start eroding into the wet peat 33. Even if this would happen however, the wet peat would not be entrained in the vacuum stream due to its greater density.

It will be understood, of course, that while the form of the invention shown and described constitute a preferred embodiment, it is not intended to illustrate all possible forms of the invention. It will also be understood that the words used are words of description rather than words of limitation and that various changes, such as changes in shape, size, and arrangement of parts may be made without departing from the spirit and scope of the invention herein disclosed.

In the claims:
1. A method of separating a strata of dry, milled peat from a strata of substantially damp peat and collecting said dry peat, comprising the steps of:
   (a) directing a first stream of air onto the strata of dry, milled peat;
   (b) controlling the velocity of said stream of air to loosen the strata of dry peat from the strata of substantially damp peat while leaving the substantially damp peat undisturbed; and
   (c) producing a vacuum contiguous to the peat bed and collecting the dry, loosened peat into the second air stream of the vacuum.

2. A method of separating a strata of dry, milled peat from a strata of substantially damp peat and collecting said dry peat, comprising the steps of:
   (a) directing a first stream of air onto the strata of dry, milled peat;
   (b) controlling the velocity of said first stream of air to a degree wherein the strata of dry peat is completely loosened from the substantially damp peat and the strata of substantially damp peat remains undisturbed;
   (c) producing a vacuum contiguous to the peat bed and entraining the loosened peat in a second stream of air; and
   (d) reducing the velocity of said second stream of air at a point subsequent to the entrainment of said dry peat to precipitate the entrained dry peat from said second stream of air into a collection area.

3. A method of separating a strata of dry, milled peat from the surface of a substantially damp strata of peat and collecting said separated dry peat, comprising the steps of:
   (a) directing a jet of air onto said peat bed;
   (b) controlling the velocity of said jet of air to about 50 feet per second thereby loosening said dry, milled peat from the strata of damp peat;
   (c) producing a vacuum contiguous to the peat bed and near the point of reflection of said jet of air from the peat bed by removing a stream of air;
   (d) controlling the velocity of said stream of air to about 50 feet per second, sufficient to entrain said loosened dry, milled peat;
   (e) reducing the velocity of said stream of air subsequent to the entrainment of said dry peat to precipitate the entrained dry peat from said stream of air into a collection area.

4. A method of separating an upper strata of dry material from a lower strata of damp material, the material of said upper strata having a density less than that of the material of said lower strata, and collecting the material of said upper strata, comprising the steps of:
   (a) directing a jet of air onto the strata of dry material;
   (b) controlling the velocity of said jet of air so that the strata of dry material is loosened from the strata of damp material;
   (c) producing a vacuum contiguous to the loosened material; and
   (d) entraining said loosened material in the air stream of the vacuum.

References Cited
UNITED STATES PATENTS

| | | | |
|---|---|---|---|
| 928,995 | 7/1909 | Moulton | 37—3 |
| 1,033,164 | 7/1912 | Fahrney | 15—346 |
| 2,932,845 | 4/1960 | Rydberg | 15—346 |

FOREIGN PATENTS 950,964  10/1956  Germany.

ABRAHAM G. STONE, *Primary Examiner.*

A. E. KOPECKI, *Assistant Examiner.*